United States Patent [19]

Flexman, Jr.

[11] Patent Number: 5,286,807
[45] Date of Patent: Feb. 15, 1994

[54] IMPACT RESISTANT POLYOXYMETHYLENE COMPOSITIONS

[75] Inventor: Edmund A. Flexman, Jr., Wilmington, Del.

[73] Assignee: E. I. Du Pont de Nemours and Company, Wilmington, Del.

[21] Appl. No.: 551,678

[22] Filed: Jul. 10, 1990

Related U.S. Application Data

[63] Continuation of Ser. No. 270,467, Nov. 9, 1988, abandoned, which is a continuation of Ser. No. 76,982, Jul. 21, 1987, abandoned, which is a continuation of Ser. No. 814,055, Dec. 27, 1985, abandoned, which is a continuation of Ser. No. 570,036, Jan. 16, 1984, abandoned, which is a continuation-in-part of Ser. No. 464,412, Feb. 7, 1983, abandoned.

[51] Int. Cl.$^5$ ............................................. C08L 75/04
[52] U.S. Cl. ..................................... 525/399; 428/36.8
[58] Field of Search .......................................... 525/399

[56] References Cited

U.S. PATENT DOCUMENTS

| | | | |
|---|---|---|---|
| 4,582,869 | 4/1986 | Waggoner | 525/66 |
| 4,707,525 | 11/1987 | LaNieve, III et al. | 525/399 |
| 4,845,161 | 7/1989 | Richardson | 525/399 |
| 4,978,725 | 12/1990 | Reske et al. | 525/399 |

FOREIGN PATENT DOCUMENTS

| | | | |
|---|---|---|---|
| 0120711 | 10/1984 | European Pat. Off. | 525/399 |
| 0121407 | 10/1984 | European Pat. Off. | 525/399 |
| 1193240 | 7/1962 | Fed. Rep. of Germany | |
| 2051028 | 4/1971 | Fed. Rep. of Germany | |
| 1017244 | 1/1966 | United Kingdom | |

*Primary Examiner*—Ana L. Carrillo

[57] ABSTRACT

Polyoxymethylene compositions having 5-15 wt. thermoplastic polyurethane; where the polyurethane has a soft segment glass transition of lower than 0° C., the polyoxymethylene has a molecular weight of 20,000-100,000, and the polyurethane is dispersed in the polyoxymethylene as discrete particles show extraordinary impact resistance as measured by Gardner impact.

28 Claims, No Drawings

IMPACT RESISTANT POLYOXYMETHYLENE COMPOSITIONS

CROSS REFERENCE TO RELATED APPLICATIONS

This application is a continuation of U.S. application Ser. No. 270,467, filed Nov. 9, 1988, now abandoned, which is a continuation of U.S. application Ser. No. 076,982, filed Jul. 21, 1987, now abandoned, which is a continuation of U.S. application Ser. No. 814,055, filed Dec. 27, 1985, now abandoned, which is a continuation of U.S. application Ser. No. 570,036, filed Jan. 16, 1984, now abandoned, which is a continuation-in-part of U.S. application Ser. No. 464,412, filed Feb. 7, 1983, now abandoned.

TECHNICAL FIELD

This invention relates to certain polyoxymethylene compositions which are characterized by extraordinary impact resistance. Polyoxymethylene compositions are generally understood to include compositions based on homopolymers of formaldehyde or of cyclic oligomers of formaldehyde, for example trioxane, the terminal groups of which are end-capped by esterification or etherification, as well as copolymers of formaldehyde or of cyclic oligomers of formaldehyde, with oxyalkylene groups with at least two adjacent carbon atoms in the main chain, the terminal groups of which copolymers can be hydroxyl terminated or can be end-capped by esterification or etherification. The proportion of the comonomers can be up to 20 weight percent. Compositions based on polyoxymethylene of relatively high molecular weight, i.e. 20,000 to 100,000 are useful in preparing semi-finished and finished articles by any of the techniques commonly used with thermoplastic materials, e.g. compression molding, injection molding, extrusion, blow molding, rotational molding, melt spinning, stamping and thermoforming. Finished products made from such compositions possess extremely desirable physical properties, including high stiffness, strength, chemical stability and solvent resistance. However, in certain applications, it would be desirable to have greater impact resistance than has heretofore been possible with conventional polyoxymethylene compositions.

BACKGROUND ART

U.S. Pat. No. 2,993,025, granted Jul. 18, 1961 to Alsup et al; U.S. Pat. No. 3,027,352, granted Mar. 27, 1962 to Walling et al; U.S. Pat. No. 3,743,614, granted Jul. 3, 1973 to Wolters et al; U.S. Pat. No. 3,787,353, granted Jan. 22, 1974 to Ishii et al; U.S. Pat. No. 3,960,984, granted Jun. 1, 1976 to Kohan; and U.S. Pat. No. 4,098,843, granted Jul. 4, 1978 to Johnson, all disclose various polyoxymethylene compositions, both those based on homopolymers and those based on copolymers and various techniques for stabilizing such compositions. Alsup discloses stabilization of polyoxymethylene compositions by blending therewith a synthetic polyamide. Walling discloses that the thermal stability of certain polyoxymethylene copolymer compositions is improved as compared with corresponding homopolymer. Wolters discloses stabilization of polyoxymethylene compositions by blending therewith a combination of an alkaline earth metal compound and an ester of-an (alkyl-hydroxyphenyl)-carboxylic acid with a polyol. Ishii discloses stabilization of polyoxymethylene compositions by blending therewith a compound of the formula $R(NHCOCH_2X)_n$ where R is a hydrocarbon group, X is a cyano or carbamoyl group, and n is 2-6. Kohan discloses stabilization of polyoxymethylene compositions by blending therewith an amide oligomer. Johnson discloses stabilization of polyoxymethylene compositions by blending therewith a dispersion of polyamide in a carrier resin.

The polyoxymethylene compositions described in the patents cited above are examples of compositions that can be modified according to the present invention to give compositions characterized by extraordinary impact resistance.

Various additives have been used with polyoxymethylene compositions to improve the toughness or impact strength of such compositions. None have been able to achieve the extraordinary degree of impact resistance reached in the present invention. In addition, the compositions of the present invention achieve the extraordinary degree of impact resistance with a minimal sacrifice of other desirable properties of such compositions.

U.S. Pat. No. 3,795,715, granted Mar. 5, 1974 to Cherdon et al, discloses improving the impact strength of polyoxymethylene compositions by blending therewith 0.1-10 parts by weight of a polymer having (a) an average molecular weight of 1,000-1,000,000, (b) a softening temperature below the crystallite melting point of the polyoxymethylene, and (c) a second order transition temperature of $-120°$ to $+30°$ C., this latter polymer being present in the form of particles of 0.1-5 microns in diameter. Such copolymers include polyethylene, ethylene/propylene copolymers, (meth)acrylic acid ester homo- or copolymers, diene homo- or copolymers, and vinyl ester homo- or copolymers. Modest improvements in impact strength as measured by a falling weight test are disclosed.

U.S. Pat. No. 4,277,577, granted Jul. 7, 1981 to Burg et al, discloses polyoxymethylene compositions similar to those disclosed by Cherdon, above, except that they also contain 0.01-20 weight percent of a third polymeric component which can be a segmented thermoplastic copolyester or a polyurethane.

U.S. Pat. No. 3,850,873, granted Nov. 26, 1974 to Wurmb et al, discloses improving the physical properties (including impact strength) of glass fiber reinforced polyoxymethylene compositions by blending therewith 0.5-10 weight percent of a high molecular weight thermoplastic polyurethane. The polyurethane is not defined, except by two examples. Modest improvements in impact strength are disclosed.

British Patent 1,381,106, published Jan. 22, 1975, discloses improving the impact strength of polyoxymethylene block copolymers by copolymerizing an elastomeric terpolymer having a molecular weight of at least 100,000 with the polyoxymethylene block copolymer via urethane, ureide, thiourethane or thioureide linkages.

U.S. Pat. No. 3,476,832, granted Nov. 4, 1969 to Pritchard, discloses improving the impact resistance of thermoplastic oxymethylene polymers by blending therewith up to 20% of a rubbery polymeric material having a glass transition temperature below 0° C. Preferably, the rubbery material is dispersed as particles having an average diameter of less than 20 microns. Thermoplastic polyurethanes are not mentioned, and only modest increases in impact strength are reported.

U.S. Pat. No. 3,642,940, granted Feb. 15, 1972 to Burg et al, discloses improving the impact strength of polyoxymethylene molding compositions by blending therewith a two phase mixture of an elastomeric and a hard polymer. Thermoplastic polyurethanes are not mentioned as possible elastomeric components of the two phase mixture.

U.S. Pat. No. 3,749,755, granted Jul. 31, 1973 to Bronstert et al, discloses improving the impact resistance of thermoplastic polyoxymethylene molding compositions by blending therewith an elastomeric graft copolymer having a glass transition temperature below $-20°$ C. Thermoplastic polyurethanes are not mentioned.

Other examples of various additives, other than thermoplastic polyurethanes, for improving the impact resistance of polyoxymethylene compositions are disclosed in U.S. Pat. No. 3,975,459, granted Aug. 17, 1976 and U.S. Pat. No. 4,017,558, granted Apr. 12, 1977, both to Schmidt et al; Japanese Patent Publication 48-15,954, published Feb. 28, 1973; and Japanese Patent Publication 52-019,752, published Feb. 15, 1977.

None of the references discussed or listed above report the extraordinary impact resistance which can be achieved by the techniques of the present invention.

DISCLOSURE OF THE INVENTION

This invention relates to certain polyoxymethylene compositions which are characterized by extraordinary impact resistance. The term "polyoxymethylene" as used herein includes homopolymers of formaldehyde or of cyclic oligomers of formaldehyde, the terminal groups of which are end-capped by esterification or etherification, and copolymers of formaldehyde or of cyclic oligomers of formaldehyde with oxyalkylene groups with at least two adjacent carbon atoms in the main chain, the terminal groups of which copolymers can be hydroxyl terminated or can be end-capped by esterification, or etherification.

It has been found that certain polyoxymethylenes can be formulated into compositions with extraordinary impact resistance far in excess of any degree of impact resistance that has been previously achieved with such polyoxymethylenes. More specifically, when certain polyoxymethylenes having high molecular weights are melt compounded with certain thermoplastic polyurethane elastomers having low glass transition temperatures, such that the proportion of thermoplastic elastomer is 5-15% by weight, and further such that the thermoplastic polyurethane elastomer is intimately mixed with and dispersed as discrete particles throughout the polyoxymethylene, the resulting compositions are characterized by extraordinary impact resistance as measured in a standard Gardner impact test (ASTM D-3029, Method G, Geometry D) using a 3.6 kg (8lb) weight and injection molded $7.62 \times 12.7 \times 0.16$ cm ($3'' \times 5'' \times 1/16''$) plaques. The polyoxymethylene compositions of the present invention will be characterized by a Gardner impact value of greater than 9 J (80 in-lb), preferably greater than 17 J (150 in-lb), and in the most preferred cases greater than 25 J (225 in-lb). This can be contrasted with unmodified polyoxymethylene, which will show a Gardner impact value of about 1.8 J or lower. In fact, several of the compositions of the present invention are characterized by an impact resistance so high, that it is beyond the range measured in the standard Gardner impact test, which means a Gardner impact value of greater than about 36 J (320 in-lb).

It has been found that polyoxymethylene compositions with exceptionally high impact resistance, i.e. a Gardner impact value greater than 9 J (80 in-lb), can be made only when several important parameters or conditions coexist.

In particular, extraordinarily impact resistant polyoxymethylene compositions require that the polyoxymethylene polymer be of a certain molecular weight. More specifically, the polyoxymethylene polymer can be branched or linear and must have a number average molecular weight in the range of 20,000 to 100,000, preferably 25,000 to 90,000, more preferably 30,000 to 70,000, and most preferably 35,000 to 40,000. The molecular weight of the polyoxymethylene can be conveniently measured by gel permeation chromatography in m-cresol at 160° C. using a Du Pont PSM bimodal column kit with nominal pore size of 60 and 1000 Å. If the molecular weight of the polyoxymethylene polymer is too high, then processing limitations come into play, and it will be difficult to blend the polyoxymethylene with the thermoplastic polyurethane in a short enough time and at a low enough temperature to prevent significant degradation of either. This is because blending of the polyoxymethylene with the thermoplastic polyurethane is normally done at a temperature which is relatively close to the temperature at which the thermoplastic polyurethane will degrade, given enough time at that temperature. If the molecular weight of the polyoxymethylene is too high, the amount of mechanical energy necessary to achieve intimate mixing of the blend components will be so great that it will be difficult to maintain the temperature of the blend below the degradation temperature of the polyurethane, even with external cooling on the mixing apparatus. In addition, if the molecular weight of the polyoxymethylene is too high, there will be excessive orientation of the polyoxymethylene during molding of thin pieces, resulting in a lower Gardner impact value. If the molecular weight of the polyoxymethylene is too low, the melt viscosity of the polyoxymethylene will be low, and it will be difficult to achieve sufficient intimate mixing with the polyurethane such that the polyurethane will be dispersed throughout the polyoxymethylene as discrete particles.

As an alternative to characterizing the polyoxymethylene by its number average molecular weight, it can be characterized by its melt flow rate. Polyoxymethylenes which are suitable for use in the compositions of the present invention will have a melt flow rate (measured according to ASTM D-1238, Procedure A, Condition G with a 1.0 mm (0.0413 inch) diameter orifice) of 0.1-30 grams/10 minutes. Preferably, the melt flow rate of the polyoxymethylene used in the compositions of the present invention will be from 0.5-10 grams/10 minutes, most preferably about 5 grams/10 minutes for homopolymer and about 9 grams/10 minutes for copolymer.

As indicated above, the polyoxymethylene can be either a homopolymer, a copolymer or a mixture thereof. Copolymers can contain one or more comonomers generally used in preparing polyoxymethylene compositions. Comonomers more commonly used include alkylene oxides of 2-12 carbon atoms. If copolymer is selected, the quantity of comonomer will be not more than 20 weight percent, preferably not more than 15 weight percent, and most preferably about 2 weight percent. The most preferred comonomer is ethylene oxide, and preferred polyoxymethylene copolymers are dipolymers of formaldehyde and ethylene oxide where the quantity of ethylene oxide is about 2 weight percent. Generally, polyoxymethylene homopolymer is preferred over copolymer because of its greater stiffness. The most preferred homopolymers for use in the compositions of the present invention are those with a molecular weight of about 38,000 and those whose terminal hydroxyl groups have been end-capped by a chemical reaction to form ester or ether groups, preferably acetate or methoxy groups, respectively.

The proportion of the polyoxymethylene in the compositions of the present invention should be 5-95% by weight of the composition. Accordingly, the thermoplastic polyurethane will comprise 5-15% by weight of the composition. It should be understood that the compositions of the present invention include compositions containing only polyoxymethylene and polyurethane in the above-stated proportions and also compositions containing other ingredients, modifiers and/or additives including polyamide stabilizers, such as those disclosed in U.S. Pat. Nos. 3,960,984 and 4,098,843, anti-oxidants, pigments, colorants, carbon black, reinforcing agents and fillers, provided that the above-stated relative proportions of the polyoxymethylene and the thermoplastic polyurethane are maintained. Within the limits described above, and assuming all other parameters are equal, the greater the proportion of the thermoplastic polyurethane, the higher the impact resistance of the compositions of the present invention. However, at high levels of polyurethane, the incremental benefit with respect to Gardner impact resistance diminishes. Accordingly, to achieve an optimum balance between the extraordinary impact resistance of the compositions of the present invention and the other highly desirable properties ordinarily present in polyoxymethylene compositions, compositions containing 8 to 12 weight percent of polyurethane are generally preferred, most preferably about 10 weight percent polyurethane.

Another important parameter necessary to the preparation of polyoxymethylene compositions characterized by exceptional impact resistance is the selection of particular thermoplastic polyurethanes. Thermoplastic polyurethanes suited for use in the compositions of the present invention can be selected from those commercially available or can be made by processes known in the art. (See, for example, Rubber Technology, 2nd edition, edited by Maurice Morton (1973), Chapter 17, Urethane Elastomers, D. A. Meyer, especially pp. 453-6). Polyurethanes are derived from the reaction of polyester or polyether diols with diisocyanates and optionally also from the further reaction of such components with chain-extending agents such as low molecular weight polyols, preferably diols, or with diamines to form urea linkages. Polyurethane elastomers are generally composed of soft segments, for example polyether or polyester polyols, and hard segments, usually derived from the reaction of the low molecular weight diols and diisocyanates. Polyurethane elastomer with no hard segments can be used to prepare compositions of the present invention. However, those most useful in the compositions of the present invention will contain both soft and hard segments.

In the preparation of the thermoplastic polyurethanes useful in the compositions of the present invention, a polymeric soft segment material having at least two hydroxyl groups per molecule and having a molecular weight of at least about 500 and preferably from about 550 to about 5,000 and most preferably from about 1,000 to about 2,500, such as a dihydric polyester or a polyalkylene ether diol, is reacted with an organic diisocyanate in a ratio such that a substantially linear polyurethane polymer results, although some branching can be present. A diol chain extender having a molecular weight less than about 250 may also be incorporated. The mole ratio of isocyanate to hydroxyl in the polymer is preferably from about 0.95 to 1.08, more preferably 0.95 to 1.05, and most preferably, 0.95 to 21.00. In addition, monofunctional isocyanates or alcohols can be used to control molecular weight of the polyurethane.

Suitable polyester polyols include the polyesterification products of one or more dihydric alcohols with one or more dicarboxylic acids. Suitable dicarboxylic acids include adipic acid, succinic acid, sebacic acid, suberic acid, methyladipic acid, glutaric acid, pimelic acid, azelaic acid, thiodipropionic acid and citraconic acid and mixtures thereof including small amounts of aromatic dicarboxylic acids. Suitable dihydric alcohols include ethylene glycol, 1,3- or 1,2-propylene glycol, 1,4-butanediol, 1,3-butanediol, 2-methyl pentane diol-1,5, diethylene glycol, 1,5-pentanediol, 1,6-hexanediol, 1,12-dodecanediol and mixtures thereof.

Further, hydroxycarboxylic acids, lactoneso and cyclic carbonates, such as ε-caprolactone and 3-hydroxybutyric acid can be used in the preparation of the polyester.

Preferred polyesters include poly(ethylene adipate), poly(1,4-butylene adipate), mixtures of these adipates and poly ε-caprolactone.

Suitable polyether polyols include the condensation products of one or more alkylene oxides with a small amount of one or more compounds having active hydrogen containing groups, such as water, ethylene glycol, 1,2- or 1,3-propylene glycol, 1,4-butanediol and 1,5-pentanediol, and mixtures thereof. Suitable alkylene oxide condensates include those of ethylene oxide, 1,2-propylene oxide and butylene oxide and mixtures thereof. Suitable polyalkylene ether glycols may also be prepared from tetrahydrofuran. In addition, suitable polyether polyols can contain comonomers, especially as random or block comonomers, ether glycols derived from ethylene oxide, propylene oxide and/or tetrahydrofuran (THF). Alternatively, a THF polyether copolymer with minor amounts of 3-methyl THF can also be used.

Preferred polyethers include poly(tetramethylene ether) glycol (PTMEG), poly(propylene oxide) glycol, copolymers of propylene oxide and ethylene oxide, and copolymers of tetrahydrofuran and ethylene oxide. Other suitable polymeric diols include those which are primarily hydrocarbon in nature, e.g., polybutadiene diol.

Suitable organic diisocyanates include 1,4-butylene diisocyanate, 1,6-hexamethylene diisocyanate, cyclopentylene-1,3-diisocyanate, 4,4″-dicyclohexylmethane diisocyanate, isophorone diisocyanate, cyclohexylene-1,4-diisocyanate, 2,4-tolylene diisocyanate, 2,6-tolylene diisocyanate, isomeric mixtures of 2,4- and 2,6-tolylene diisocyanate, 4,4″-methylene bis(phenylisocyanate), 2,2-diphenylpropane-4,4″-diisocyanate, p-phenylene diisocyanate, m-phenylene diisocyanate, xylylene diisocyanate, 1,4-naphthylene diisocyanate, 1,5-naphthylene diisocyanate, 4,4″-diphenyl diisocyanate, azobenzene-4,4″-diisocyanate, m- or p-tetramethylxylene diisocyanate and 1-chlorobenzene-2,4-diisocyanate. 4,4″-Methylene bis(phenylisocyanate), 1,6-hexamethylene diisocyanate, 4,4″-dicyclohexylmethane diisocyanate and 2,4-tolylene diisocyanate are preferred.

Secondary amide linkages including those derived from adipyl chloride and piperazine, and secondary urethane linkages, including those derived from the bis-chloroformates of PTMEG and/or butanediol, can also be present in the polyurethanes.

Dihydric alcohols suitable for use as chain extending agents in the preparation of the thermoplastic polyurethanes include those containing carbon chains which are either uninterrupted or which are interrupted by oxygen or sulfur linkages, including 1,2-ethanediol, 1,2-propanediol, isopropyl-a-glyceryl ether, 1,3-propanediol, 1,3-butanediol, 2,2-dimethyl-1,3-propanediol, 2,2-diethyl-1,3-propanediol, 2-ethyl-2-butyl-1,3-propanediol, 2-methyl-2,4-pentanediol, 2,2,4-trimethyl-1,3-pentanediol, 2-ethyl-1,3-hexanediol, 1,4-butanediol, 2,5-hexanediol, 1,5-pentanediol, dihydroxycyclopentane, 1,6-hexanediol, 1,4-cyclohexanediol, 4,4''-cyclohexanedimethylol, thiodiglycol, diethylene glycol, dipropylene glycol, 2-methyl-1,3-propanediol, 2-methyl-2-ethyl-1,3-propanediol, dihydroxyethyl ether of hydroquinone, hydrogenated bisphenol A, dihydroxyethyl terephthalate and dihydroxymethyl benzene and mixtures thereof. Hydroxyl terminated oligomers of 1,4-butanediol terephthalate can also be used, giving a polyester-urethane-polyester repeating structure. Djamines can also be used as chain extending agents giving urea linkages. 1,4-Butanediol, 1,2-ethanediol and 1,6-hexanediol are preferred.

In the preparation of the thermoplastic polyurethanes the ratio of isocyanate to hydroxyl should be close to unity, and the reaction can be a one step or a two step reaction. Catalyst can be used, and the reaction can be run neat or in a solvent.

Apart from what is described above concerning selection of the polyurethane, the most important characteristic of the thermoplastic polyurethane is its soft segment glass transition temperature (Tg). Wherever a glass transition temperature is reported herein, it is as determined using a Du Pont Model 981 Dynamic Mechanical Analysis Cell attached to a Model 990 DTA instrument. The cell was modified to use liquid nitrogen as the coolant and to allow the use of a 3.2 cm (1.25 inch) gap holding the specimen. The oscillation amplitude was set at 0.2 mm. A heating rate of 2.5° C./min was used from $-170°$ C. to 0° to 40° C. depending on the signal amplitude. Readings were taken every 1° C. increment. The storage and loss moduli were plotted and the major loss modulus peak was defined as the soft segment glass transition temperature. It has been found that, all other parameters being equal, the lower the glass transition temperature of the soft segment of the thermoplastic polyurethane, the higher the impact resistance. Compositions of the present invention having extraordinary impact resistance can best be made when the soft segment glass transition temperature of the thermoplastic polyurethane is less than 0° C. Preferably, the soft segment glass transition temperature of the polyurethane should be less than $-10°$ C., more preferably below $-15$ C., and most preferably below $-30°$ C. Combinations or mixtures of thermoplastic polyurethanes can also be used in the compositions of the present invention.

These parameters discussed above have been found to be the most important in determining whether one can prepare a polyoxymethylene/thermoplastic polyurethane composition having extraordinary impact resistance. Clearly, the optimum composition, i.e. the composition having the highest impact resistance while maintaining an adequate level of other properties important in polyoxymethylene compositions and fabricated articles, will result when one chooses materials and conditions representing the optimum value for each of these most important parameters. For example, to achieve the optimum composition, one should choose a polyoxymethylene homopolymer of moderate molecular weight (e.g. about 30,000–40,000) and a thermoplastic polyurethane of low soft segment glass transition temperature (e.g. about $-35°$ C.), and one should blend about 90% by weight of the polyoxymethylene with about 10% by weight of the thermoplastic polyurethane in such a way as to intimately mix these two components and to disperse the thermoplastic polyurethane in the polyoxymethylene as small discrete particles. Equally clearly, one can prepare compositions of the present invention having extraordinary impact resistance, albeit perhaps not as high as the optimum composition, by deviating from the optimum on one or more of most important parameters discussed above. These parameters, however, are interdependent, each with each other, and the effect of deviating from the optimum on each of these parameters may be cumulative. Thus if one chooses to operate at the fringe with respect to several or all of these parameters, it is possible to prepare polyoxymethylene/thermoplastic polyurethane compositions that will be useful, but whose impact resistance will be less than extraordinary. Thus it becomes important to define what is considered extraordinary impact resistance.

For the purpose of defining the present invention, impact resistance is measured according to ASTM D-3029, Method G. Geometry D using a 3.6 kg weight (Gardner Impact). Each sample was injection molded as a plaque 7.6×12.7×0.16 cm (3 in × 5 in × 1/16 in). The plaques were allowed to stand at room temperature at least two days after molding prior to testing. Twenty five samples of each composition were tested at room temperature and the average value determined by the Bruceton Staircase Method was reported.

As mentioned above, the polyoxymethylene thermoplastic polyurethane compositions of the present invention are considered to have extraordinary impact resistance when they are characterized by a Gardner impact rating of greater than 9 J, preferably greater than 17 J, more preferably greater than 25 J and most preferably greater than 34 J. Accordingly, compositions of the present invention will consist essentially of (a) 5–15% by weight of at least one
thermoplastic polyurethane, which polyurethane has a soft segment glass transition temperature of lower than 0° C., and (b) 85–95% by weight of at least one polyoxymethylene polymer, which polyoxymethylene polymer has a number average molecular weight of from 20,000 to 100,000, the above-stated percentages being based on the total amount of components (a) and (b) only, the thermoplastic polyurethane being dispersed throughout the polyoxymethylene as discrete particles, and the composition having a Gardner impact value of greater than 9 J. As noted above, various other ingredients, modifiers and/or additives can be included in the compositions of the present invention, provided that the above-stated relative proportions of the polyoxymethylene and the polyurethane are maintained.

While the parameters discussed above are the most important in determining whether a particular polyoxymethylene/thermoplastic polyurethane composition will be characterized by extraordinary impact resistance, other parameters can influence to a lesser degree the impact resistance of a particular composition. For example, the molecular weight of the soft segment of the thermoplastic polyurethane will influence the properties of the composition. If the molecular weight of the soft segment is too low, the glass transition temperature will not be low enough. This is believed to be due to incomplete separation of the soft segments from the hard segments. If the molecular weight of the soft segment is too high, crystallization will result, and the polyurethane glass transition temperature will be too high. Generally, the molecular weight of the soft segment should average between about 500 and about 5000, preferably about 850–3000, more preferably about 1000–2500, with the most preferred polyurethanes having soft segments with an average molecular weight of about 2000. The desired soft segment average molecular weight can be achieved with a narrow molecular weight distribution or with a broad molecular weight distribution. In fact, one can prepare the compositions of the present invention with blends of polyurethanes having very high and very low molecular weight soft segments (outside the ranges stated above) such that the average molecular weight of the soft segment is within the ranges stated above, i.e., with polyurethanes having an extremely broad molecular weight distribution for the soft segments.

Similarly, the melt viscosity of the thermoplastic polyurethane at the compounding temperature will influence the properties of the composition. If the melt viscosity is too low, it will be difficult to disperse the polyurethane into discrete particles. If the melt viscosity is too high, the thermoplastic polyurethane becomes difficult to process at a temperature below its decomposition temperature. It is believed that the important aspect with respect to the melt viscosity of the polyurethane is how closely it approximates the melt viscosity of the polyoxymethylene at the processing temperature.

As a practical matter, melt viscosity of the polyurethane at the compounding temperature cannot be accurately measured because the preferred compounding temperatures are extremely close to the degradation temperatures of the polyurethanes. Thus, inherent viscosity of the polyurethane is used instead. Melt viscosity is related to inherent viscosity, although not necessarily in direct proportion. The preferred melt viscosity (or inherent viscosity) for the polyurethane in a given composition will depend on the chemical type of the polyurethane and the melt viscosity (or inherent viscosity) of the polyoxymethylene. For example, it has been found that when the polyurethane is of the ADIP/BDO/MDI type, such as polyurethane B in Table I below, and the polyoxymethylene in acetate endcapped homopolymer of number average molecular weight of about 38,,000,, then it is especially preferred that the inherent viscosity of the polyurethane be from 0.75–1.50. It should be understood that inherent viscosity is only a means of evaluating the approximately melt viscosity of the polyurethane, and it is the melt viscosity at the compounding temperature that is really the parameter of concern. Accordingly, it is possible to start with a polyurethane having a very low inherent viscosity, and then modify it during the blending operation, e.g., by further polymerization or cross-linking, thus increasing the effective melt viscosity of the polyurethane to a desirable level, even though the inherent viscosity of the starting material polyurethane was quite low. Alternatively, one could begin with a polyurethane having a higher inherent viscosity and degrade or hydrolyze it during compounding to obtain the desired effective melt viscosity. Alternatively, one could use blends of high and low molecular weight polyurethanes.

The moisture content of the composition, in particular of the polyurethane, can influence the results achieved. Water is known to react with polyurethanes, causing the polyurethane to degrade, lowering the effective molecular weight of the polyurethane. Accordingly, the drier the better. In any event, the ingredients in the compositions of the present invention and the compositions of the present invention themselves should contain less than 0.2 percent by weight of water, preferably less than 0.1 percent, especially when there is no opportunity for the water to escape, for example during injection molding.

The processing conditions used in the preparation and molding of the compositions of the present invention can also influence the impact resistance of the compositions. As mentioned above, the polyurethane must be intimately mixed and dispersed as discrete particles in the polyoxymethylene, and it must be maintained in that state during the formation of the finished articles. These particles of polyurethane can be approximately spherical in shape (i.e., the particles will have an aspect ratio approximately equal to 1.0) or elongated (i.e., the particles will have an aspect ratio substantially greater than 1.0), and their size distribution can be Gaussian, bi- or polymodal or other. If elongated, they can be only slightly elongated and approximately oval in shape, or they can be greatly elongated and resemble strands of thermoplastic polyurethane running through the polyoxymethylene continuous phase. Accordingly, when reference is made to the compositions of the present invention, that is meant to include molded articles or shaped products as well as melt compounded material that can be subsequently shaped or molded.

Any intensive mixing device capable of developing high shear at temperatures above the melting points of the ingredients can be used to disperse the polyurethane in the polyoxymethylene. Examples of such devices include rubber mills, internal mixers such as, "Banbury" and "Brabender" mixers, single or multiblade internal mixers with a cavity heated externally or by friction, "Ko-kneaders", multibarrel mixers such as "Farrel Continuous Mixers", injection molding machines, and extruders, both single screw and twin screw, both co-rotating and counter rotating. These devices can be used alone or in combination with static mixers, mixing torpedos and/or various devices to increase internal pressure and/or the intensity of mixing such as valves, gates or screws designed for this purpose. Continuous devices are preferred. Twin screw extruders are especially preferred, particularly those incorporating high intensity mixing sections such as reverse pitch elements and kneading elements. The mixing device used in all of the examples of the present application unless noted otherwise was a 28 mm co-rotating Werner and Pfleiderer twin screw extruder, using a screw design containing two working sections with a total of five kneading elements, two reverse elements, and a vacuum port at about 70% of the distance from the feed throat to the die. All zones were set at 190° C. Temperature of the melt coming out of the die was about 220°-260° C. A low flow of cooling water was used to reduce temperatures in some cases. The extruder was operated at 225-250 rpm with 6.8-13.6 kg (15-30 pounds) per hour throughput. A nitrogen blanket was maintained over the feed throat to exclude oxygen and preserve dryness of the ingredients, and the strand exiting the die was quenched in water and cut into pellets. One can deviate from those conditions. For example melt temperatures below 190° C. or higher than 260° C. are possible if throughput is adjusted to compensate and unmelted or decomposed product is not produced. However, 170°-260° C. is considered preferred, with 185°-240° C. preferred, and 200°-230° C. most preferred for melt compounding. The melt temperatures indicated are estimates based upon measurements taken exit the die. Depending on the extruder configuration, there can be significant cooling between the last point of mixing and the die. Actual melt temperatures may be somewhat higher.

Equally important are the fabricating conditions used in the preparation of shaped articles, for if one prepares the shaped articles of the present invention from previously melt compounded material, it is important to maintain the conditions created in the melt compounded material, such as distribution of the thermoplastic polyurethane as discrete particles in the polyoxymethylene, dryness of the composition, etc. Shaped articles can be made by any of several common methods, including compression molding, injection molding, extrusion, blow molding, rotational molding, melt spinning, thermoforming and stamping. Examples of shaped articles include sheet, profiles, rod stock, film, filaments, fibers, strapping, tape, tubing and pipe. Such shaped articles can be post treated by orientation, stretching, coating, annealing, painting, laminating and plating. Unused shaped articles, rejected shaped articles or waste composition of the present invention can be ground and remolded.

It should be noted that, in addition to having extraordinary impact resistance, the compositions of the present invention can be used to make extruded rod having improved toughness, as indicated by increased elongation in standard tensile tests. Further, a significant increase in toughness (elongation) is apparent in compositions with as little as 5% polyurethane.

In addition, preparation of thick articles, including rod, from polyoxymethylene frequently results in voids formed in the center of such articles because of the normal contraction of the polyoxymethylene upon cooling and the fact that cooling of thick articles will occur unevenly, i.e., from the outside inward. It has been found that the compositions of the present invention will produce such thick articles with significantly fewer and/or smaller voids, in some cases even eliminating the voids altogether.

Generally, the conditions used in the preparation of shaped articles will be similar to those described above for melt compounding. More specifically, melt temperatures and residence times can be used up to the points at which significant degradation of the polyurethane occurs. Preferably, the melt temperature will be about 170°-250° C., more preferably about 185°-240° C., and most preferably about 200°-230° C. When injection molding the compositions of the present invention, it is preferable that the mold be as cold as possible consistent with the intricacy of the shape being produced. That is, generally, the colder the mold, the higher the impact resistance of the shaped article. However, colder molds are harder to fill, particularly where the passages may be narrow or the shape is intricate. Generally, the mold temperature will be 10°-120° C., preferably 10°-100° C., and most preferably the mold temperature will be about 50°-90° C. Similarly, the cycle time, which determines the total hold-up time in the melt, can be adjusted to fit the particular conditions being encountered. For example, if the total hold-up time in the melt is too long, the polyurethane can degrade. If the cycle time is too short, the shaped article may not totally solidify while the mold is still under pressure. Generally, total hold-up time in the melt will be about 3-15 minutes, with the shorter times being preferred, consistent with giving a high quality shaped article. As an example, the 0.16 cm (1/16 in) thick test specimens used in the Gardner impact tests can be prepared in a 6 ounce reciprocating screw injection molding machine using cylinder temperatures of 180°-210° C. with a mold temperature of 25°-120° C., a minimal back pressure, a screw speed of 60-120 rpm, a fast ram speed setting, a cycle of 30/15-60/30 seconds for injection/hold, and a general purpose screw. Samples were allowed to stand for at least two days between molding and testing. Specific molding conditions used in each of the Examples are described in Table II below.

In the following examples, there are shown specific embodiments of the present invention and certain side-by comparisons with embodiments of control experiments where one or more of the parameters discussed above was chosen outside the range defining the limits of the present invention. It will be seen that the compositions of the present invention are characterized by extraordinary impact resistance, while the control compositions are not. All parts and percentages are by weight, and all temperatures are in degrees Celsius unless otherwise specified. Measurements not originally in SI units have been so converted and rounded where appropriate.

In the following examples Flexural Modulus was determined in accord with ASTM 790, Geometry A, Method A on three specimens and the average value is reported. Samples were allowed to stand at least two days at room temperature after molding. The chemical composition of each of the commercially available thermoplastic polyurethanes tested was determined using a "Varian Associates" model XL 200 nuclear magnetic resonance spectrometer. Proton spectra were used. The thermoplastic polyurethane was dissolved in deutero-1,1,2,2-tetrachloroethane at 2-5% solids and was examined at 100°-120° C.

In the following examples, in addition to the thermoplastic polyurethane and the polyoxymethylene, all but three (the controls in Tables III and IV and the acetate end-capped homopolymer having a number average molecular weight of about 38,000 in Example 33) of the compositions tested contained 1.5 weight percent of a polyamide oligomer stabilizer (as described in U.S. Pat. No. 3,960,984) and 0.1 weight percent of a 4,4"-butylidene bis(6-t-butyl-m-cresol) antioxidant. The controls in Tables III and IV and the acetate end-capped homopolymer having a molecular weight of about 38,000 in Example 33 contained 0.4% of a polyamide stabilizer (terpolymer of approximately 38% polycaprolactam, 35% polyhexamethylene adipamide, and 27% polyhexamethylene sebacamide) and 0.1% of 2,2"-methylene bis(6-t-butyl-4-methyl phenol). In addition, the copolymers used in Examples 28-33 may have contained additives proprietary to the supplier. Unless stated otherwise, the polyoxymethylene was an acetate end-capped homopolymer (prepared according to U.S. Pat. No. 2,998,409) having a number average molecular weight of about 38,000. The use of stabilizers and antioxidants is not necessary for the operability of the present invention. They were used in the following examples to improve thermal and oxidative stability, and they do not exert a significant influence on the impact resistance of the compositions tested.

The chemical composition, inherent viscosity, and glass transition temperature of each of the thermoplastic polyurethanes used in the following examples is summarized in Table I below:

TABLE I

| Poly-urethane | Composition (wt %) | I.V. | Tg (°C.) |
|---|---|---|---|
| B | 37 ADIP, 39 BDO, 24 MDI | 1.33 | −35 |
| C | 56 PTMEG, 9 BDO, 35 MDI | 1.50 | −61 |
| D | 60 PTMEG, 7 BDO, 33 MDI | 1.29 | −28 |
| E | 56 PTMEG, 8 BDO, 37 MDI | 1.65 | −26 |
| F | 44 PTMEG, 11 BDO, 45 MDI | 1.59 | 4 |
| G | 37 ADIP, 39 BDO, 24 MDI | 1.04 | −35 |
| H | 46 ADIP, 30 EG, 24 MDI | 0.78 | −20 |
| I | 44 ADIP, 35 BDO, 17 MDI, 4 HDPDM | 1.41 | −15 |
| J | 37 ADIP, 39 BDO, 24 MDI | 1.13 | −35 |
| K | 34 ADIP, 37 BDO, 27 MDI | 0.81 | −33 |
| L | 35 ADIP, 35 BDO, 30 MDI | 1.19 | −33 |
| M | 34 ADIP, 37 BDO, 29 MDI | 0.67 | −13 |
| N | 32 ADIP, 33 BDO, 4 EG | 0.73 | −10 |

TABLE I-continued

| Poly-urethane | Composition (wt %) | I.V. | Tg (°C.) |
|---|---|---|---|
| O | 27 ADIP, 21 HDO, 37 PICM, 15 DEG | 1.20 | −10 |

ADIP = adipic acid
BDO = butane diol
MDI = 4,4'-methylene bis(phenylisocyanate)
PTMEG = polytetramethylene ether glycol
EG = ethylene glycol
HDPDM = dihydroxypropyl diphenyl ether
HDO = hexane diol
PICM = 4,4'-methylene bis(cyclohexylisocyanate)
DEG = diethylene glycol The Gardner impact test plaques were injection molded by various conditions in the following examples, depending on the compositions being molded and the purpose of the experiment. A summary of the molding conditions follows in Table II.

TABLE II

| | | Barrel Temp. (°C.) | | | | Mold | Cycle | Press. | |
|---|---|---|---|---|---|---|---|---|---|
| Example | Machine | Rear | Cent. | Front | Noz. | Temp (°C.) | (Sec.) | (MPa) | Rate |
| 1 | C | 190 | 190 | 190 | 190 | 90 | 30/15 | 6.9 | fast |
| 2 | D | 180 | 180 | 180 | 180 | 90 | 15/15 | 4.5 | 1.2 |
| 3 | D | 180 | 180 | 180 | 180 | 90 | 15/15 | 4.5 | 1.2 |
| 4 | D | 180 | 180 | 180 | 180 | 90 | 15/15 | 4.5 | 1.2 |
| 5 | C | 190 | 190 | 190 | 190 | 90 | 30/15 | 6.9 | fast |
| 6 | D | 180 | 180 | 180 | 180 | 90 | 15/15 | 4.5 | 1.2 |
| 7 | C | 190 | 190 | 190 | 190 | 90 | 30/15 | 11.0 | fast |
| 8 | C | 190 | 190 | 190 | 190 | 90 | 30/15 | 11.7 | fast |
| 9 | C | 190 | 190 | 190 | 190 | 90 | 30/15 | 11.7 | fast |
| 10 | B | 195 | 195 | 195 | 195 | 90 | 35/15 | 6.9 | fast |
| 11 | A | 180 | 190 | 200 | 210 | 60 | 45/15 | 3.8 | 5 |
| 12 | D | 190 | 190 | 190 | 205 | 40 | 3/30/15 | 3.4 | 10 |
| 13 | C | 190 | 190 | 190 | 190 | 90 | 30/15 | 6.9 | fast |
| 18 | D | 180 | 180 | 180 | 180 | 60 | 15/15 | 6.2/4.1 | fast |
| 18 | D | 180 | 180 | 180 | 180 | 100 | 15/15 | 4.8/4.1 | fast |
| 19 | C | 190 | 190 | 190 | 190 | 90 | 30/15 | 6.9 | fast |
| 20 | B | 195 | 195 | 195 | 195 | 90 | 35/15 | 6.9 | fast |
| 21 | C | 190 | 190 | 190 | 190 | 90 | 30/15 | 6.9 | fast |
| 22 | C | 190 | 190 | 190 | 190 | 90 | 30/15 | 6.9 | fast |
| 23 | B | 195 | 195 | 195 | 195 | 90 | 35/15 | 6.9 | fast |
| 24 | B | 195 | 195 | 195 | 195 | 90 | 35/15 | 6.9 | fast |
| 25 | B | 195 | 195 | 195 | 195 | 90 | 35/15 | 6.9 | fast |
| 26 | B | 195 | 195 | 195 | 195 | 90 | 35/15 | 6.9 | fast |
| 27 | A | 180 | 190 | 200 | 210 | 60 | 45/15 | 3.8 | 5 |
| 28 | D | 190 | 190 | 190 | 205 | 40 | 3/30/15 | 3.4 | 10 |
| 29 | C | 190 | 190 | 190 | 190 | 90 | 30/15 | 6.9 | fast |
| 30 | B | 195 | 195 | 195 | 195 | 90 | 35/15 | 6.9 | fast |
| 31 | C | 190 | 190 | 190 | 190 | 90 | 30/15 | 6.9 | fast |
| 32 | D | 190 | 190 | 190 | 205 | 80 | 3/30/15 | 4.1/3.4 | 10 |
| 33 | D | 190 | 190 | 190 | 205 | 80 | 3/30/15 | 4.1/3.4 | 10 |
| 34 | D | 190 | 190 | 190 | 205 | 80 | 3/30/15 | 4.1/3.4 | 10 |
| 35 | D | 190 | 190 | 190 | 205 | 80 | 3/30/15 | 4.1/3.4 | 10 |
| 36 | C | 190 | 190 | 190 | 190 | 90 | 3/30/15 | 6.9 | fast |
| 37 | C | 190 | 190 | 190 | 190 | 90 | 30/15 | 6.9 | fast |
| 37 | C | 190 | 190 | 190 | 190 | 90 | 30/15 | 7.6 | fast |

In Table II above, the machine used in each of the Examples is as follows:
A = 1½ oz. "Arburg" Model 221-75-350
B = 6 oz. "Van Dorn" Model 125-RS-6
C = 6 oz. "Van Dorn" Model 150-RS-6
D = 6 oz. "HPM" Model S125-1X6

EXAMPLE 1

Preparation of Thermoplastic Polyester Polyurethane

Thermoplastic polyurethanes suitable for use in the compositions of the present invention can be selected from among those commercially available or can be made by techniques known in the art. A typical suitable polyester polyurethane was made as follows:

A cylindrical reaction vessel with a hemispherical bottom was used. The vessel was about 95 mm inside diameter and about 160 mm high. It terminated in a 55/50 inner joint. It was used with a top made from a 55/50 outer joint which was fitted with a 10 mm "Truebore" stirring guide for the mechanical stirrer, a 10/30 outer joint for the thermometer (17.8 cm immersion), and an additional 29/26 outer joint to allow additions. The stirrer blade was a glass propeller about 41 mm wide.

438.0 grams of a mixture containing 3280 g of "Rucoflex" S 102 P 55 (dried hydroxy terminated butylene adipate, hydroxyl number =55) and 819.7 g of recently distilled 4,4"-methylene bis(phenylisocyanate) was added to the cylindrical polymerization vessel. 1 drop (about 0.01 g) of "DABCO" 33 LV (33 wt. % trimethylene diamine in dipropylene glycol) cyclic amine catalyst was added to this mixture. The catalyst was stirred into the diol mixture for 2 hours. Then 9 drops DABCO 33LV was added with 14.95 g butane diol (dried). After 4 minutes of rapid stirring, the viscous mass was poured into a pan (coated with Teflon$\alpha$ fluorocarbon polymer) which had been preheated in a 100° C. vacuum oven. The oven containing the pan and the polymerizing mixture was evacuated to 9 inches mercury pressure and swept with nitrogen.

The polymerization was allowed to continue for 46 hours at 100° C. and 0.95 atmosphere of nitrogen. The polymer which resulted, hereinafter referred to as polyurethane A, was removed from the vacuum oven and allowed to cool. The inherent viscosity determined for this polymer was 1.04 (0.1% in DMF at 30° C.).

Polyurethane A was then chopped into cubes (6 mm on an edge) for melt compounding, injection molding and Gardner testing as described above. The Gardner impact for a blend of 10% of this polyurethane in polyoxymethylene homopolymer was 32.1 J.

EXAMPLES 2–9

Effect of Thermoplastic Polyurethane Proportion

Polyurethane B, described in detail in Table I, above, was blended in various proportions into polyoxymethylene homopolymer, injection molded into test plaques, and tested for flexural modulus and Gardner impact with the following results:

TABLE III

| Example | Polyurethane (wt %) | Flex. Mod. (MPa) | Gardner (J) |
|---|---|---|---|
| Control | 0 | 2830 | 1.8 |
| 2 | 3 | 2770 | 6.6 |
| 3 | 5 | 2560 | 10.0 |
| 4 | 7 | 2370 | 18.0 |
| 5 | 10 | 2160 | >36 |
| 6 | 15 | 1940 | >36 |

A similar series of experiments was conducted with acetate end-capped polyoxymethylene homopolymer having a number average molecular weight of about 63,000 with the following results:

TABLE IV

| Example | Polyurethane (wt %) | Flex. Mod. (MPa) | Gardner (J) |
|---|---|---|---|
| Control | 0 | 2620 | 0.9 |
| 7 | 5 | 2330 | 9.3 |
| 8 | 10 | 1923 | 6.7 |
| 9 | 15 | 1720 | 29.0 |

It can be seen that compositions characterized by extraordinary impact resistance can be prepared from compositions containing as little as 5 weight percent of polyurethane, and that generally, the more polyurethane, the higher the impact resistance rating.

EXAMPLES 10–13

Effect of Polyurethane Soft Segment Glass Transition Temperature

Compositions were prepared with 10 weight percent of each of four chemically similar thermoplastic polyurethanes and 90 weight percent of polyoxymethylene homopolymer. All four of the polyurethanes have PTMEG soft segments and BDO/MDI hard segments. In addition, the inherent viscosity of the four polyurethanes was within a relatively narrow range. Plaques were prepared and tested as described above, with the results reported in Table V below:

TABLE V

| Example | Polyurethane | Gardner (J) | Soft Segment Tg (°C.) |
|---|---|---|---|
| 10 | C | 34.3 | −61 |
| 11 | D | 21.4 | −28 |
| 12 | E | 17.5 | −26 |
| 13 | F | 0.9 | 4 |

EXAMPLES 14–17

Effect of Polyurethane Inherent Viscosity

As discussed above, it is most preferred that the melt viscosity of the polyurethane and of the polyoxymethylene match at the processing temperature. Inherent viscosity is used as an approximation, and this example demonstrates the optimum polyurethane inherent viscosity for one particular system.

The compositions prepared for each of these four examples contained 5% polyurethane in polyoxymethylene homopolymer. The polyurethanes used in each of these examples was chemically analyzed as being essentially the same as polyurethane B (listed in Table I above), The samples were all prepared as described for Example 35 in Table II above, and the results are reported in Table VI below:

TABLE VI

| Example | Inherent Viscosity | Gardner (J) |
|---|---|---|
| 14 | 0.64 | 13.9 |
| 15 | 0.96 | 34.2 |
| 16 | 1.36 | 32.9 |
| 17 | 1.91 | 8.8 |

EXAMPLE 18

Effect of Mold Temperature

Blends of 10 weight percent of polyurethane B and 90 weight percent of polyoxymethylene homopolymer were melt compounded and injection molded into plaques under identical conditions except that some plaques were prepared in a 60° C. mold, and others were prepared in a 100° C. mold. Other processing conditions are described in detail in Table II above. The plaques from the 60° C. mold had a Gardner impact value of 36 J. The plaques from the 100° C. mold had a Gardner impact value of 7.3 J.

EXAMPLES 19-31

Comparison of Various Thermoplastic Polyurethanes

A variety of polyurethanes were blended at 10 weight percent with 90 weight percent polyoxymethylene homopolymer, injection molded into test plaques as described in Table II above, and tested for Gardner impact. Table VII below, summarizes the results of these experiments along with the inherent viscosity and glass transition temperature of each of the polyurethanes:

TABLE VII

| Example | Polyurethane | Gardner (J) | Soft Segment Tg (°C.) | I.V. |
| --- | --- | --- | --- | --- |
| 19 | G | 36.2 | −35 | 1.04 |
| 20 | H | 35.3 | −20 | 0.78 |
| 21 | I | 34.7 | −15 | 1.41 |
| 22 | J | 34.4 | −35 | 1.13 |
| 23 | C | 34.4 | −60 | 1.50 |
| 24 | K | 33.4 | −33 | 0.81 |
| 25 | L | 27.1 | −33 | 1.19 |
| 26 | M | 22.9 | −13 | 0.67 |
| 27 | D | 21.4 | −28 | 1.29 |
| 28 | E | 17.5 | −26 | 1.65 |
| 29 | N | 14.9 | −10 | 0.73 |
| 30 | O | 3.2 | 10 | 1.20 |
| 31 | F | 0.9 | 4 | 1.59 |

EXAMPLES 32-36

Polyoxymethylene Copolymer Compositions

Polyoxymethylene copolymers can also be used to prepare compositions characterized by extraordinary impact resistance. In each of the following examples, 10 weight percent of polyurethane B was melt compounded as described above with 90 weight percent of each of the listed polyoxymethylene copolymers and a comparative polyoxymethylene homopolymer. Standard test plaques were prepared by injection molding, as described in Table II above, and Gardner impact values were obtained. The results are reported in Table VIII below. All of the polyoxymethylene polymers in these examples are dipolymers containing approximately 2 weight percent ethylene oxide, except for Example 36, which is a homopolymer.

TABLE VIII

| Example | Copolymer | Gardner (J) |
| --- | --- | --- |
| 32 | "Celcon" M-90-14 | 34.5 |
| 33 | "Mitsubishi Gas Chemical" F20-01 | 33.2 |
| 34 | "Polyplastics" M90-02 | 30.1 |
| 35 | "Ultraform" N-2320 | 33.4 |
| 36 | "Asahi" 5010 (homopolymer) | 34.5 |

EXAMPLE 37

Compositions Containing Mixtures of Different Polyoxymethylenes

While it is preferred to prepare the shaped articles of the present invention from the compositions of the present invention containing a single polyoxymethylene, and more preferably where that polyoxymethylene is an acetate end-capped homopolymer having a number average molecular weight of about 38,000, products having extraordinary impact resistance can be prepared from compositions containing blends of different polyoxymethylenes.

One part of a melt compounded composition containing 30 weight percent of polyurethane B in 70 weight percent of an acetate end-capped polyoxymethylene homopolymer having a number average molecular weight of about 63,000 was dry blended with two parts each of two different low molecular weight polyoxymethylenes. One was an acetate end-capped homopolymer having a molecular weight of about 38,000. The other was "Polyplastic" M90-02, which is a dipolymer containing about 2 weight percent ethylene glycol. Each dry blend was injection molded as described in Table II above and tested for Gardner impact. These compositions, each now containing 10 weight percent polyurethane, gave Gardner impact values of 27.6 J and 24.4 J, respectively.

EXAMPLE 38

Improved Elongation of Extruded Rod

A composition containing 93.6% of polyoxymethylene homopolymer (molecular weight ≈66,000), 5% polyurethane B, 0.2% ethylene bis-stearamide lubricant, 0.75% polyamide stabilizer, 0.11% antioxidant and 0.3% UV stabilizer was prepared in a 28 mm twin screw extruder. An additional 0.025% lubricant was added to pellets of this composition as a surface coating.

Rods were produced using a 2-inch TEC single screw extruder attached to a manifold and dual 70 mm rod dies. A dual positive take-off brake was used. Extrusion conditions were as follows:

barrel, adaptor and die temperatures 340°, 350°, 360°, 370°, 370°, 370° F.

melt temperature 375° F.

melt pressure 650–750 psi water temperature for forming die 85° F.

take-off rate ½ in/min.

Samples of rod were machined into test specimens. Discs somewhat over ⅛ inch thick were cut off the rods using a lathe. Discs were inspected to see they were free of surface imperfections. Using a surface grinder they were reduced to a uniform thickness of ⅛ inch. A center strip ½ inch wide was cut from each disc, and tensile specimens were cut from them with a router. The test section was ⅛ in × ⅛ in × 1⅜ in. Five specimens from each rod were tested for tensile strength and elongation according to the procedure set forth in ASTM D-638. Resulted are given in Table IX below:

TABLE IX

| | Tensile Strength (psi) | | Elongation (%) | |
| --- | --- | --- | --- | --- |
| | Average | Range | Average | Range |
| Control* | 7800 | 7300–8200 | 7.0 | 5.1–9.5 |
| Composition | 7600 | 2100–8000 | 10.8 | 8.1–14.0 |

*100% polyoxymethylene homopolymer (molecular weight 66,000)

INDUSTRIAL APPLICABILITY

The polyoxymethylene compositions of the present invention are useful in the manufacture of extruded and finished articles such as ski bindings, mechanical conveyors and small engine components. The extraordinary impact resistance and exceptional wear resistance of articles made from these compositions combined with other outstanding properties normally found in polyoxymethylene compositions make them particularly well suited for applications such as gears and moving parts.

BEST MODE

Although the best mode of the present invention, i.e. the single best polyoxymethylene composition of the present invention, will depend upon the particular desired end use and the specific requisite combination of properties for that use, the single composition and molding conditions of the present invention that result in a product most preferred for its overall balance of properties is described in detail in Examples 5 and 18 (60° C. mold temperature). While it is not a part of the present invention, it is preferred to incorporate in the compositions of the present invention about 0.3 weight percent ethylene bis-stearamide and about 0.1 weight percent of a polycarbodiimide (or a mixture of polycarbodiimides) having a molecular weight of about 1000 and containing units of the formula

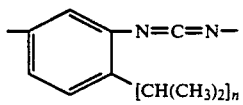

where n has an average value of about 3.

I claim:

1. A impact resistant thermoplastic polyoxymethylene composition consisting essentially of
   (a) 5-15 weight percent of at least one thermoplastic polyurethane, which polyurethane has a soft segment glass transition temperature of lower than 0° C., and
   (b) 85-95 weight percent of at least one polyoxymethylene polymer, which polyoxymethylene polymer has a number average molecular weight of from 20,000 to 100,000, the above-stated percentages being based on the total amount of components (a) and (b) only, the thermoplastic polyurethane being dispersed throughout the polyoxymethylene polymer as discrete particles, and the composition having a Gardner impact value of greater than 9 J.

2. The composition of claim 1 wherein the polyoxymethylene is a homopolymer.

3. The composition of claim 1 wherein the polyoxymethylene is a copolymer.

4. The composition of claim 3 wherein the polyoxymethylene contains at least one comonomer which is an oxyalkylene group with at least two adjacent carbon atoms in the main valence chain.

5. The composition of claim 4 wherein the comonomer is selected from the group consisting of alkylene oxides of 2-12 carbon atoms., 6. The composition of claim 5 wherein the copolymer is a dipolymer and the comonomer is ethylene oxide.

7. The composition of claim 4 wherein the weight percent of comonomer in the polyoxymethylene copolymer is from 0.1 to 20.0.

8. The composition of claim 7 wherein the comonomers comprise not more than 15.0 weight percent of the copolymer.

9. The composition of claim 8 wherein the comonomers comprise about 2 weight percent of the copolymer.

10. The composition of claim 1 which has a Gardner impact value of greater than 17 J.

11. The composition of claim 1 which has a Gardner impact value of greater than 25 J.

12. The composition of claim 1 wherein the polyoxymethylene polymer has a number average molecular weight of 25,000 to 90,000.

13. The composition of claim 1 wherein the polyoxymethylene polymer has a number average molecular weight of 30,000 to 70,000.

14. The composition of claim 1 wherein the polyoxymethylene polymer has a melt flow rate of 0.1-30.0 grams/10 minutes.

15. The composition of claim 1 wherein the polyoxymethylene polymer has a melt flow rate of 0.5-10.0 grams/10 minutes.

16. The composition of claim 1 wherein the thermoplastic polyurethane comprises 8 to 12 weight percent of the composition.

17. The composition of claim 1 wherein the thermoplastic polyurethane comprises soft segments having a molecular weight of at least 500.

18. The composition of claim 1 wherein the thermoplastic polyurethane comprises soft segments having a molecular weight of from 550 to 5000.

19. The composition of claim 1 wherein the thermoplastic polyurethane comprises soft segments having a molecular weight of from 1000 to 2500.

20. The composition of claim 1 wherein the thermoplastic polyurethane contains a diol chain extender having a molecular weight of less than about 250.

21. The composition of claim 1 wherein the thermoplastic polyurethane has a ratio of isocyanate to hydroxyl of 0.95 to 1.08.

22. The composition of claim 1 wherein the thermoplastic polyurethane has a ratio of isocyanate to hydroxyl of 0.95 to 1.05.

23. The composition of claim 1 wherein the thermoplastic polyurethane has a ratio of isocyanate to hydroxyl of 0.95 to less than 1.00.

24. The composition of claim 1 wherein the thermoplastic polyurethane has a soft segment glass transition temperature of lower than −10° C.

25. The composition of claim 1 wherein the thermoplastic polyurethane has a soft segment glass transition temperature of lower than −15° C.

26. The composition of claim 1 wherein the thermoplastic polyurethane has a soft segment glass transition temperature of lower than −30° C.

27. The composition of claim 1 which is suited for use in the preparation of shaped articles.

28. Shaped articles made from the composition of claim 1.

* * * * *